CHASE & SAUNDERS.
Hand-Plow.
No. 12,478.   Patented Mar. 6, 1855.
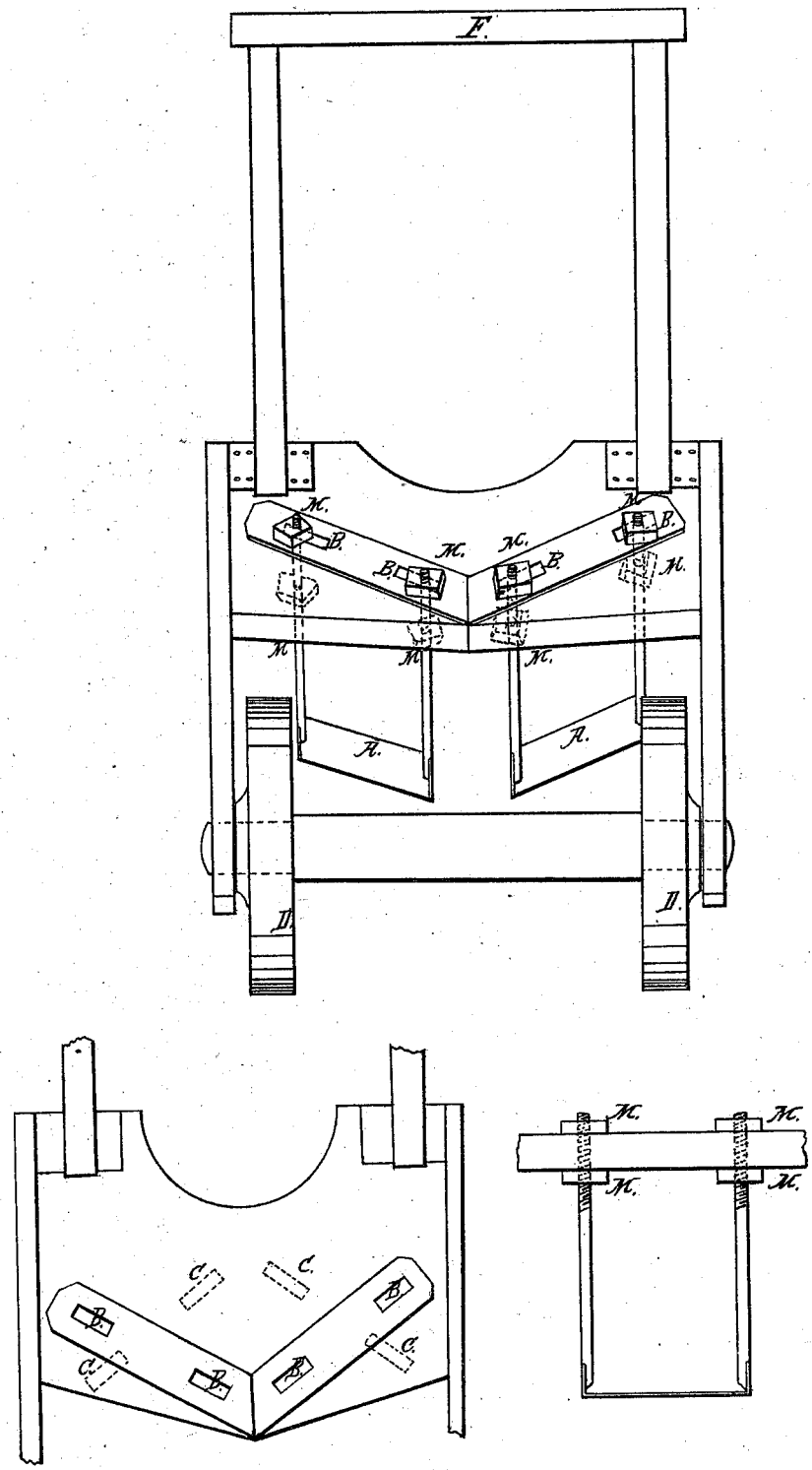

UNITED STATES PATENT OFFICE.

NEHEMIAH B. CHASE AND CHAUNCEY W. SAUNDERS, OF WILKINSONVILLE, MASSACHUSETTS.

IMPROVEMENT IN HAND-CULTIVATORS.

Specification forming part of Letters Patent No. 12,478, dated March 6, 1855.

*To all whom it may concern:*

Be it known that we, NEHEMIAH B. CHASE and CHAUNCEY W. SAUNDERS, of Wilkinsonville, in the county of Worcester and State of Massachusetts, have invented a new and useful Hoeing-Machine; and we do hereby declare that the following is a full, clear, and exact description of the construction and operation of the same, reference being had to the drawing herewith presented, making a part of this specification, and to the letters of reference marked thereon.

Our machine consists of a frame to hold two knives, A A, placed at some distance below it, the frame being provided with wheels, as at D, and a handle, F, to propel it. The knives, being held in the slots B B, admit of being placed nearer together or farther apart, and are also adjustable as to distance from the frame by nuts M' M', the knives A A to be sharpened on one or both edges and placed at an angle with each other, which will vary according to the amount of hilling required, and will generally be from ninety to one hundred and twenty degrees; but may be more or less, if necessary. The less the angle the greater the tendency of the knives to throw the dirt toward or from the row, each knife being made long enough to reach more than half-way across the space between the rows, the wheels to be of sufficient height to have the axle and frame to clear the tops of the plants, or, in the case of onions, they may be just high enough to break the tops, as required, while the knives A A cut a little below the surface. If the knives are sharpened only on one side, there should be slats made, as at C C, so as to set them in that position.

To operate our machine set the knives as near together as the size of the plants will allow and push them along the row, holding the handle so that they shall cut the depth required and loosen the earth on both sides of the row, the angle of the knives giving them a tendency to throw the earth a little from the plants, and if wished to throw it toward them or hill them the machine may be drawn or the knives set as at C C, and pass as before.

We are aware that a hand-cultivator carried on wheels has been constructed with shares not guarded at the points and having both a rotary and a lateral adjustability. Therefore we do not claim these features; but

What we claim, and desire to secure by Letters Patent of the United States, is—

The arrangement of the knives A A upon the frame so as to be adjustable in an oblique direction, and also reversible, as set forth.

N. B. CHASE,
C. W. SAUNDERS.

Witnesses:
WILLIAM PHIPPS,
JAS. G. ARNOLD.